(12) United States Patent
Lim

(10) Patent No.: US 7,597,350 B2
(45) Date of Patent: Oct. 6, 2009

(54) CURTAIN AIRBAG FOR VEHICLE

(75) Inventor: Chang Hyun Lim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 100 days.

(21) Appl. No.: 11/728,860

(22) Filed: Mar. 27, 2007

(65) Prior Publication Data

US 2008/0129018 A1 Jun. 5, 2008

(30) Foreign Application Priority Data

Dec. 4, 2006 (KR) .................. 10-2006-0121526

(51) Int. Cl.
*B60R 21/21* (2006.01)
*B60R 21/213* (2006.01)
(52) U.S. Cl. .................. 280/730.2; 280/728.2
(58) Field of Classification Search ............. 280/728.2, 280/730.2
See application file for complete search history.

(56) References Cited

U.S. PATENT DOCUMENTS

| | | | |
|---|---|---|---|
| 5,884,937 A * | 3/1999 | Yamada | 280/730.2 |
| 6,378,896 B1 * | 4/2002 | Sakakida et al. | 280/730.2 |
| 7,052,037 B2 * | 5/2006 | Nakayasu et al. | 280/730.2 |
| 2007/0075526 A1 * | 4/2007 | Kjell et al. | 280/728.2 |
| 2007/0273128 A1 * | 11/2007 | Cheal | 280/728.2 |
| 2007/0296189 A1 * | 12/2007 | Berntsson et al. | 280/730.2 |
| 2008/0061535 A1 * | 3/2008 | Everard et al. | 280/728.2 |

FOREIGN PATENT DOCUMENTS

| | | |
|---|---|---|
| JP | 2002-211338 | 7/2002 |
| JP | 2003-291768 | 10/2003 |
| JP | 2004-074867 | 3/2004 |
| JP | 2005-132309 | 5/2005 |
| KR | 1996-042205 | 10/1998 |
| WO | WO-2006094638 A1 * | 9/2006 |

* cited by examiner

*Primary Examiner*—Paul N. Dickson
*Assistant Examiner*—Joselynn Y. Sliteris
(74) *Attorney, Agent, or Firm*—Morgan, Lewis & Bockius LLP

(57) ABSTRACT

A curtain airbag for a vehicle includes an airbag cushion, an end of which is mounted to an inner panel inside the vehicle, and having a folded portion above the end; and an inflator for deploying the airbag cushion, mounted near the end of the airbag cushion. The folded portion may be wound in a spiral. The inflator may be mounted to a center pillar of the pillar trim, and extend toward the inside of the vehicle. The deployment of the airbag cushion is guided by the inflator.

9 Claims, 2 Drawing Sheets

CURTAIN AIRBAG FOR VEHICLE

CROSS-REFERENCE TO RELATED APPLICATION

This application claims priority to, and the benefit of, Korean Patent Application No. 10-2006-0121526, filed in the Korean Intellectual Property Office on Dec. 4, 2006, the entire contents of which are incorporated herein by reference.

BACKGROUND OF THE INVENTION (a) Field of the Invention

The present invention relates to a curtain airbag for a vehicle in which a spiral-folded airbag cushion is disposed above a mounting part, and an inflator is disposed below the airbag cushion. The airbag cushion deploys stably without the need for a separate bracket or cover.

(b) Description of the Related Art

A curtain airbag is installed along an upper side of a passenger compartment, and deploys in a vehicle rollover or a side impact collision. A conventional curtain airbag includes an airbag cushion disposed at a specific position along a roof rail inside a passenger compartment, a cushion holder that attaches an upper end of the cushion to the roof rail; and an inflator at a side of the cushion.

Typically, a bracket is provided at a position where a pillar trim and a head lining are connected to one another, to prevent the curtain airbag from being caught by the pillar trim when it deploys. However, the vehicle body may deform during a collision. The pillar trim may move, causing deployment problems.

A structure that prevents the curtain airbag from interfering with the pillar trim during deployment would therefore be desirable.

SUMMARY OF THE INVENTION

The present invention provides a curtain airbag with relatively few components that deploys in a precise direction.

An exemplary embodiment of the present invention provides a curtain airbag for a vehicle including an airbag cushion, an end of which is mounted to an inner panel inside the vehicle, and having a folded portion above the end; and an inflator for deploying the airbag cushion, mounted near the end of the airbag cushion.

The folded portion may be wound in a spiral. The inflator may be mounted to a center pillar of the pillar trim, and extend toward the inside of the vehicle. The deployment of the airbag cushion is guided by the inflator.

DETAILED DESCRIPTION OF THE PREFERRED EMBODIMENTS

An exemplary embodiment of the present invention will hereinafter be described in detail with reference to the accompanying drawings.

Figure 1:
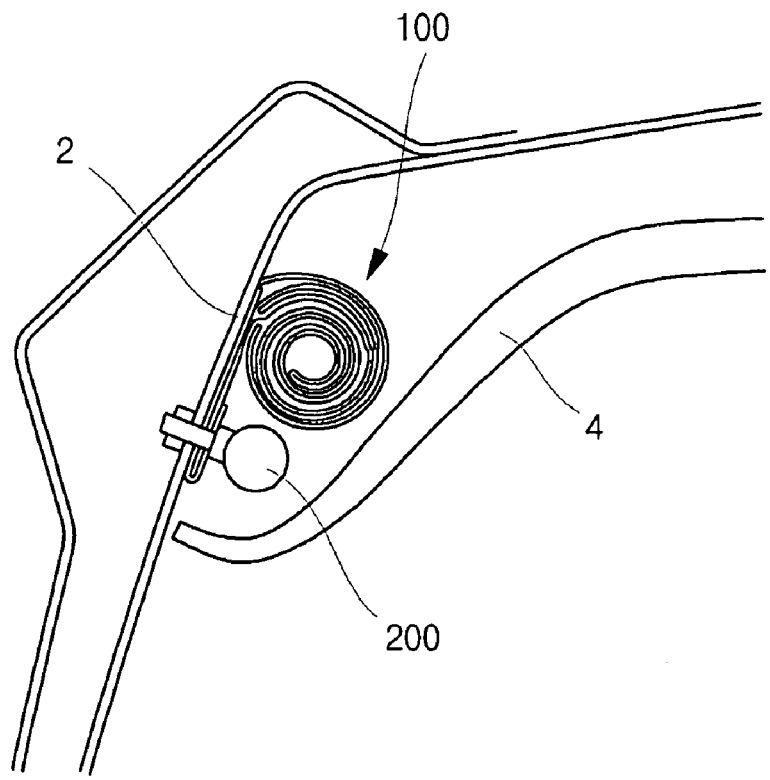
FIG. 1 is a side cutaway view of a curtain airbag according to an exemplary embodiment of the present invention.

Referring to FIG. 1, a curtain airbag according to an exemplary embodiment of the present invention includes an airbag cushion 100, a bottom end of which is mounted to an inner panel 2 inside a vehicle. The airbag cushion 100 extends upward from its bottom end and is folded several times, such as by being rolled into a spiral. An inflator 200 is provided below the airbag cushion 100 so as to deploy the airbag cushion 100. A separate airbag cover is not required.

Deployment direction of the airbag cushion 100 varies depending on the position of the inflator 200. In some embodiments, the inflator 200 is disposed below the center of the airbag cushion 100, and installed to a center pillar of a pillar trim.

Figure 2:
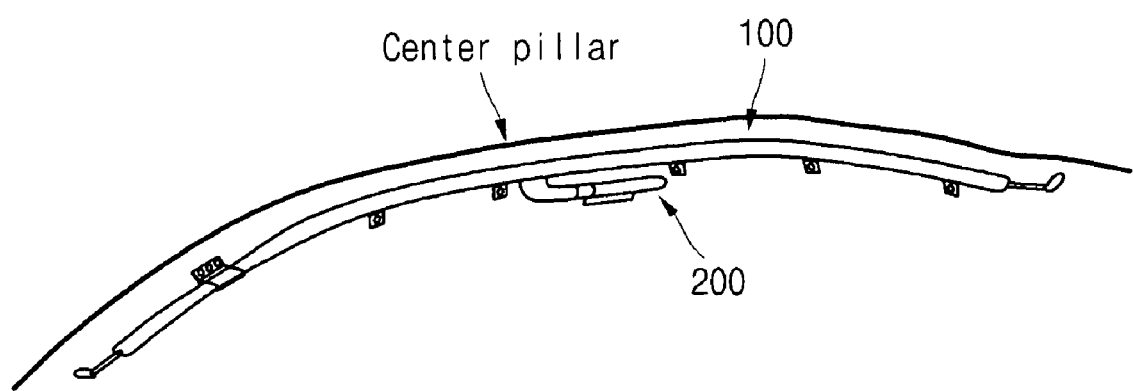
FIG. 2 illustrates an exemplary installation mechanism of the airbag of FIG. 1.

Referring to FIG. 2, the airbag cushion 100 of a curtain airbag is installed to the center pillar. To avoid being caught or malfunction during operation, the inflator 200, which is installed to the center pillar, guides the airbag cushion 100 to deploy smoothly.

Figure 3:
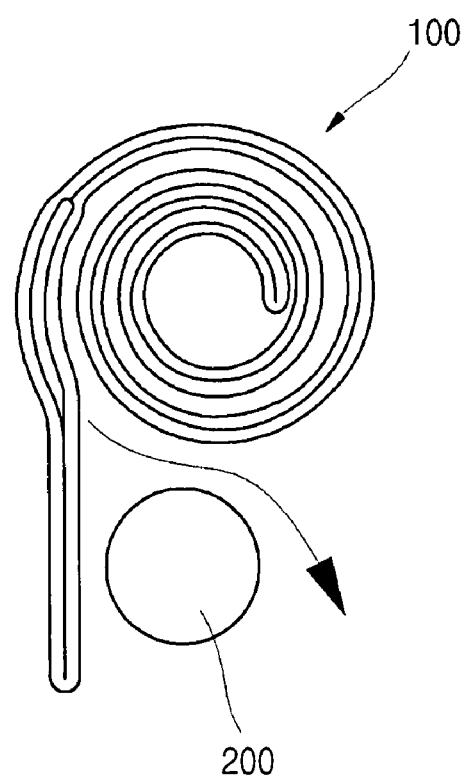
FIG. 3 illustrates the deployment of the curtain airbag of FIG. 1.

Referring to FIG. 3, in a vehicle rollover or side collision, a signal indicating impact is input from a sensor (not shown) to a controller (not shown). Once the signal is received, the controller instructs the inflator 200 to supply the gas necessary to deploy the airbag cushion 100. The sensor, controller, and inflator can be designed and implemented by a person of ordinary skill in the art based on the teachings herein.

The airbag cushion 100 fills with gas and starts to pressurize a head lining 4 and deploy into the passenger compartment. In the illustrated embodiments, with the inflator 200 disposed below the airbag cushion 100, deployment takes place in the direction of the arrow in FIG. 3.

As described above, a curtain airbag for a vehicle according to the present invention does not need a separate bracket or cover, so the manufacturing cost is reduced, and since there is a marginal space between the airbag cushion and the head lining, design freedom is enhanced, and more space is provided in the passenger compartment.

Furthermore, since the inflator is disposed at a position where the airbag is most likely to be caught, malfunction of the curtain airbag is prevented and the curtain airbag is deployed in a desired direction, thereby minimizing injuries. In addition, efficiency of work is enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A curtain airbag for a vehicle, comprising:
   an airbag cushion, comprising an end mounted to an inner panel inside the vehicle, and a folded portion disposed above the end; and
   an inflator, configured to deploy the airbag cushion and mounted near the airbag cushion end,
   wherein a deployment direction of the airbag cushion is guided by a body of the inflator so as to prevent the curtain airbag from interfering with the inner panel; and
   wherein the inflator is mounted to the inner panel.

2. The curtain airbag of claim 1, wherein the folded portion comprises a spiral fold.

3. The curtain airbag of claim 1, wherein the inflator extends from the airbag cushion end toward an inside of the vehicle.

4. The curtain airbag of claim 1, wherein the inflator is mounted to a center pillar.

5. The curtain airbag of claim 1, wherein a longitudinal axis of the inflator is disposed along a longitudinal axis of the rolled airbag cushion in parallel.

6. A curtain airbag for a vehicle, comprising:
an airbag cushion including an end mounted to a pillar trim inside the vehicle and a folded portion disposed above the end; and
an inflator configured to deploy the airbag cushion and mounted near the end of the airbag cushion,
wherein a deployment direction of the airbag cushion is guided by a body of the inflator; and
wherein the inflator is mounted to the pillar trim.

7. The curtain airbag of claim 6, wherein a longitudinal axis of the inflator is parallel to a longitudinal axis of the folded portion of the airbag cushion.

8. The curtain airbag of claim 6, wherein the folded portion comprises a spiral fold.

9. The curtain airbag of claim 6, wherein the inflator extends from the end of the airbag cushion toward the interior of the vehicle.

* * * * *